(12) United States Patent
Charriere et al.

(10) Patent No.: US 12,085,706 B2
(45) Date of Patent: Sep. 10, 2024

(54) DUAL VIEWFINDER FOR OBSERVING DEVICE

(71) Applicant: Commissariat à l'Energie Atomique et aux Energies Alternatives, Paris (FR)

(72) Inventors: Simon Charriere, Grenoble (FR); Pierre Joly, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 94 days.

(21) Appl. No.: 18/068,659

(22) Filed: Dec. 20, 2022

(65) Prior Publication Data
US 2023/0204937 A1 Jun. 29, 2023

(30) Foreign Application Priority Data
Dec. 26, 2021 (FR) .................................... 21 14531

(51) Int. Cl.
*G02B 23/14* (2006.01)
*G02B 27/10* (2006.01)
(Continued)

(52) U.S. Cl.
CPC ........... *G02B 23/14* (2013.01); *G02B 27/106* (2013.01); *G02B 27/14* (2013.01); *H04N 23/53* (2023.01); *H04N 23/633* (2023.01)

(58) Field of Classification Search
CPC ...... G02B 23/14; G02B 27/106; G02B 27/14; G02B 23/105; G02B 27/0081; H04N 23/53; H04N 23/633; G03B 13/06
See application file for complete search history.

(56) References Cited

U.S. PATENT DOCUMENTS 5,099,265 A 3/1992 Lee
6,650,837 B1 * 11/2003 Richiuso ................ G03B 13/08
396/374
(Continued)

FOREIGN PATENT DOCUMENTS

FR 2 989 791 A1 10/2013

OTHER PUBLICATIONS

French Preliminary Search Report and Written Opinion Issued Jul. 28, 2022 in French Application 21 14531 filed on Dec. 26, 2021 (with English Translation of Categories of Cited Documents), 9 pages.

*Primary Examiner* — Mekonnen D Dagnew
(74) *Attorney, Agent, or Firm* — Oblon, McClelland, Maier & Neustadt, L.L.P.

(57) ABSTRACT

A viewfinder with which an observing or image-recording device, such as a spotting scope or image-recording apparatus, is intended to be equipped, the observing device being configured to produce an image of an observed scene. The viewfinder allows a first image, representative of the observed scene, and a second image, different from the first image, to be displayed, the first image and the second image being juxtaposed with respect to each other. The observing device includes a first optical system and a second optical system configured to propagate the first image and the second image towards the eye of a user, along two distinct axes of propagation, respectively. The optical systems are such that passage from observing one image to observing the other image is achieved through simple natural rotation of the eye.

16 Claims, 8 Drawing Sheets

(51) Int. Cl.
  *G02B 27/14* (2006.01)
  *H04N 23/53* (2023.01)
  *H04N 23/63* (2023.01)

(56) References Cited

U.S. PATENT DOCUMENTS

| | | |
|---|---|---|
| 2003/0112355 A1* | 6/2003 | Bittner .................... G03B 13/08 |
| | | 348/E5.025 |
| 2003/0123114 A1 | 7/2003 | Kasai |
| 2015/0301334 A1 | 10/2015 | Getin et al. |
| 2016/0316147 A1* | 10/2016 | Bernstein ................ H04N 23/69 |
| 2017/0214866 A1* | 7/2017 | Zhu ......................... H04N 23/45 |
| 2020/0259985 A1 | 8/2020 | Takahashi |

* cited by examiner

DUAL VIEWFINDER FOR OBSERVING DEVICE

TECHNICAL FIELD

The technical field of the invention is a viewfinder, designed to equip image-forming devices, for example an image-recording apparatus, or devices such as binoculars or spotting scopes. The viewfinder may be applied to specific devices, for example a medical imaging device or a weapon.

PRIOR ART

Cameras generally comprise viewfinders, allowing a user to view the field of observation of the camera.

It may be a question of an optical viewfinder, which forms an image from light rays coming from the observed scene, and having propagated through the objective of the camera. The light rays directed into the viewfinder originate directly from the observed scene. They may be reflected by a splitter placed between the objective and the image sensor of the camera. It is an optical viewfinder, because it is designed using optical elements (reflectors, dioptric interfaces). Certain optical viewfinders use a dedicated objective, different from the objective associated with the sensor of the camera. The image of the scene, produced by this type of viewfinder, is affected by a parallax with respect to the image formed on the image sensor. However this parallax is generally negligible, except when the observed scene is very close.

Another type of viewfinder is the electronic viewfinder, in which the viewfinder uses a display, displaying an image representative of the image formed on the image sensor of the camera. Whereas optical viewfinders allow the observed scene to be viewed, electronic viewfinders allow the image that will potentially be recorded by the image sensor to be seen. This may allow the user to adjust the camera and to view the effect of the adjustments directly in the image produced by the viewfinder. The adjustments may for example relate to management of image composition, depth of field, or white balance.

Generally, a camera comprising an optical viewfinder comprises a display, integrated into the body of the camera. The user must then alternate between viewing through the optical viewfinder and viewing the display. He must therefore memorize one of the two images in order to make the comparison with the other image.

When the camera comprises only an electronic viewfinder, the user must remove his eye from the viewfinder to observe the scene that he desires to photograph.

Certain cameras allow, in a given viewfinder, the image of the optical viewfinder, representative of the observed scene, and the image of the electronic viewfinder, representative of the image formed on the image sensor of the camera, to be switched between. Such switching does not allow images produced by both types of viewfinder to be displayed simultaneously. Thus, comparison of the two images remains tedious.

Certain viewfinders have been designed, combining an optical viewfinder and an electronic viewfinder. In this type of viewfinder, the image produced by the electronic viewfinder appears in a frame, taking the form of a thumbnail superposed on one portion of the direct image, produced by the optical viewfinder. The superposition masks one portion of the direct image. Moreover, the image of the electronic viewfinder is displayed in the form of a thumbnail, the dimensions of which are small with respect to the image of the optical viewfinder. This does not allow a good comparison to be made between the two images.

The invention described below improves the possibilities of comparison of two images, corresponding to a given scene, while involving a minimal movement of the eye, the latter never being removed from the viewfinder. One particular application regards photography, the invention improving the possibilities of comparison between the image of the observed scene and the image perceived by the image sensor. Other possible applications are described at the end of the description, the aim being to facilitate comparison of two different images.

SUMMARY OF THE INVENTION

A first subject of the invention is a viewfinder, intended to be placed facing an eye of a user of an observing device, the observing device comprising an observation objective intended to form an image of an observed scene, the viewfinder comprising:
  a means for forming a first image, representative of the observed scene;
  a first optical system, coupled to the means for forming the first image, and arranged to propagate the first image to a first exit pupil, about a first optical axis, the light rays forming the first image reaching the first exit pupil by propagating about the first optical axis;
the viewfinder being characterized in that it comprises:
  a secondary display, emitting a second image, different from the first image;
  a second optical system, lying between the secondary display and a second exit pupil, about a second optical axis, inclined with respect to the first optical axis, the second optical system being configured to propagate the second image to the second exit pupil, the light rays forming the second image reaching the second exit pupil by propagating about the second optical axis;
The viewfinder may be such that:
  the first exit pupil and the second exit pupil are tangent to the same spherical surface, the diameter of which is comprised between 1.5 cm and 3 cm, so that the diameter of the spherical surface corresponds to the ocular diameter;
  the first optical axis and the second optical axis converge, to a point of convergence, corresponding to the centre of said spherical surface, so that the point of convergence is located in the eye of the user such that the user may view
    the first image when the eye is oriented along the first optical axis;
    the second image when the eye is oriented along the second optical axis.

Preferably, the first optical axis and the second optical axis are coplanar. Preferably, the first optical axis and the second optical axis lie in a vertical or horizontal plane.

According to one embodiment:
  the first image and the second image, viewed respectively at the first and at the second exit pupil, extend:
    about a longitudinal axis, defining a width;
    parallel to a lateral axis, defining a height;
  the second axis and the first axis lie in a plane parallel to the lateral axis (Y), so that the first image and the second image are juxtaposed while being aligned with respect to each other parallel to the lateral axis;
  or the second axis and the first axis lie in a plane parallel to the longitudinal axis, so that the first image and the second image are juxtaposed while being aligned with respect to each other parallel to the longitudinal axis.

Preferably, the first optical axis and the second optical axis are inclined with respect to each other by an angle of inclination smaller than 40°.

According to one embodiment:
the observation objective forms the image of the observed scene about an optical axis of observation;
the first optical axis is parallel to the optical axis of observation.

According to one embodiment, referred to as the image-capturing embodiment:
the observing device is an image-capturing apparatus, comprising an image sensor, the image sensor being configured to acquire the image of the observed scene, formed by the observation objective;
the secondary display is connected to the image sensor, so that the second image is formed from the image acquired by the image sensor.

According to one possibility:
the means for forming the first image is a splitter, arranged to be placed between the observation objective and the image sensor, the splitter being oriented so as to steer the image of the observed scene, focused by the objective, towards the first optical system;
the first optical system extends from the splitter.

According to one possibility:
the means for forming the first image is an auxiliary objective, different from the observation objective, intended to form an image of the observed scene;
the first optical system extends from the auxiliary objective.

The auxiliary objective may have an optical axis parallel to the optical axis of observation.

According to one possibility:
the means for forming the first image is an auxiliary display, intended to display an image of the observed scene;
the first optical system extends from the auxiliary display.

According to one possibility, the image-capturing apparatus comprises a unit for controlling the image sensor. The viewfinder comprises:
a display, connected to the control unit and configured to display a third image;
a third optical system, configured to propagate the third image to the first optical system.

The first optical system may extend to a first exit dioptric interface, the first exit dioptric interface being positioned at a distance larger than or equal to 15 mm from the first exit pupil. The second optical system may extend to a second exit dioptric interface, the second exit dioptric interface being positioned at a distance larger than or equal to 15 mm from the second exit pupil.

In an observing embodiment, which is modular,
the observing device is magnifying, the first optical system and the observation objective being one and the same;
the image sensor is placed on a peripheral device, separate from the observing device;
the secondary display is configured to display an image acquired by the image sensor, optionally after application of an image-processing operation.

A second subject of the invention is an observing device, comprising an observation objective, intended to form an image of an observed scene, about an optical axis of observation, the observing device comprising a viewfinder according to the first subject of the invention.

The observing device may be a camera comprising an image sensor. The image sensor is configured to acquire the image of the observed scene, formed by the observation objective. The observing device comprises a viewfinder according to the image-capturing embodiment described with reference to the first subject of the invention.

The observing device may be magnifying, the first optical system and the observation objective being one and the same, the observing device comprising a viewfinder according to the modular embodiment described with reference to the first subject of the invention.

The invention will be better understood on reading the text describing examples of embodiment that are given, in the rest of the description, with reference to the figures listed below.

DESCRIPTION OF PARTICULAR EMBODIMENTS

Figure 1A:
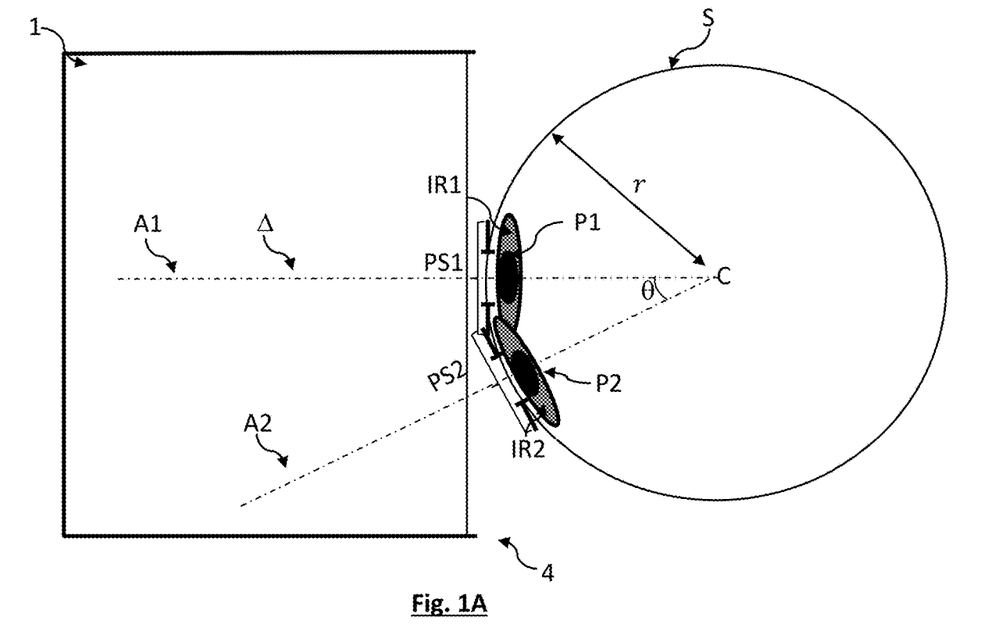
FIG. 1A schematically shows the eye of a user of the viewfinder.

FIG. 1A schematically shows an eye E of a user placed in a position of use of a viewfinder 1 of an observing device. In this example, the observing device is a still camera. Alternatively, non-limitingly, the device may be a video camera, a spotter scope or binoculars. It may also be a question of a medical imaging device, for example a video camera intended to allow real images of a biological tissue and fluorescence images of the biological tissue to be observed simultaneously. The invention is also applicable to a microscope, where it will allow images with different magnifications to be observed simultaneously.

The invention is based on the fact that under the effect of a simple rotation, the eye is able to successively view a plurality of juxtaposed images, the user remaining immobile facing the viewfinder. Thus, the viewfinder is configured to simultaneously project:

a first image I1, along a first optical axis A1;

a second image I2, different from the first image, along a second optical axis A2. By different from the first image, what is meant is that the image I2 is a separate image to the first image. The first and second images may represent the same observed scene, acquired according to different modalities.

Such a viewfinder is dual, because it allows two juxtaposed images to be observed simultaneously.

The viewfinder is configured to define a first exit pupil PS1 and a second exit pupil PS2, extending about the first optical axis A1 and the second optical axis A2, respectively.

Each exit pupil defines a region in which the image is complete and not thumbnailed when the eye is placed there.

The first exit pupil and the second exit pupil are tangent to the same spherical surface S that may be likened to the external surface of an eye. The diameter of the spherical surface S corresponds to the diameter of the eye, i.e. to about 25 mm, and more generally is comprised between 15 mm and 30 mm. In FIG. 1A the ocular radius r has been shown. The two exit pupils are placed so that the eye, via a simple rotation, may be successively positioned facing the first exit pupil, to observe the first image, and facing the second exit people, to observe the second image. Preferably, each of the pupils is just the right size to perform this function. This notably allows the viewfinder to be made more compact. Therefore, preferably, none of the pupils is comprised in the other.

The first optical axis A1 and the second optical axis A2 are secant. They converge at a point of convergence C forming the centre of the spherical surface S. Thus, when the user occupies the position of use of the viewfinder, the point of convergence C is located inside the eye. Advantageously, the point of convergence C corresponds to the centre of rotation of the eye, or lies in a central region of the eye of the user. By central region, what is meant is a region extending to within 5 mm from the centre of rotation of the eye. Use of two secant optical axes allows two different images to be displayed, without superposition on each other. The images I1 and I2 are preferably close enough together to facilitate their comparison. The invention makes it possible to prevent the two images from superposing in order to avoid an effect of masking of one image by the other image.

The position of use of the viewfinder is thus defined by the point of convergence of the two optical axes. It corresponds to the position in which the eye E is able to sequentially observe the two images, via a simple rotation.

Thus, when it occupies the position of use, via a simple rotation of his eye, the user views the first image I1, or the second image I2, by placing it facing the first exit pupil PS1 or facing the second exit pupil PS2, respectively. On account of the arrangement of the exit pupils, the user is able to successively observe the first image and the second image without moving his eye E with respect to the viewfinder, with the exception of a simple rotation. In FIG. 1A, the iris IR1, IR2 and the pupil P1, P2 have been shown in a position centred on the first optical axis A1, facing the first exit pupil PS1, and in a position centred on the second optical axis A2, facing the second exit pupil PS2, respectively. When the viewfinder is used, the eye is placed in the position of use, the pupil of the eye being placed at 25 mm, to within a tolerance, ±5 mm for example, from the point of convergence of the two optical axes.

The first optical axis A1 and the second optical axis A2 are inclined with respect to each other by an angle of inclination $\theta$. In this example, the first optical axis and the second optical axis are coplanar and belong to the same vertical plane. The angle of inclination $\theta$ corresponds to the angular offset of the first exit pupil and of the second exit pupil.

Figure 1B:
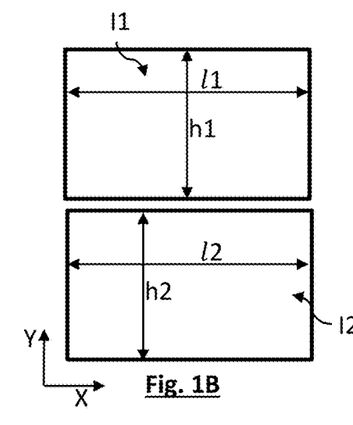
FIG. 1B shows one possible arrangement of two images displayed by the viewfinder.
Figure 1C:
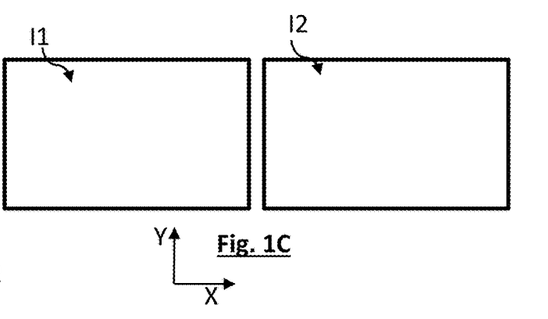
FIG. 1C shows another possible arrangement of two images displayed by the viewfinder.

More generally, each image projected by the viewfinder, onto the eye, defines, parallel to a longitudinal axis X, a width, and, parallel to a lateral axis Y, a height. The first image I1 defines a width l1 and a height h1. The second image I2 defines a width l2 and a height h2. It is preferable for the first and second images to be aligned either along the lateral axis Y, as shown in FIG. 1B, or along the longitudinal axis X, as shown in FIG. 1C. The images I1 and I2 are preferably the same size, or substantially the same size. By substantially the same size, what is meant is that they have the same width or the same height to within 10% or 20%. The fact that the images are the same size facilitates their comparison.

The configuration shown in FIG. 1B is preferred, in particular when the acquired images are in "landscape" format, i.e. longer than high, this being the commonest case. Such a configuration minimizes the angular movement of the eye required to successively observe each image.

The central axis $\Delta$ corresponds to the orientation of the eye when the user is looking straight ahead. In the configuration of FIG. 1B, it is preferable to for the first optical axis A1 to be coincident with the central axis of the eye and for the second optical axis A2 to be such that the second image is displayed below the first image. Preferably, the first optical axis and the second optical axis are coplanar. Preferably, the plane containing the first and second optical axes is vertical. In this plane, the second optical axis is located below the first optical axis. Such an arrangement of the images limits fatigue of the eye. Specifically, the ocular muscles exert themselves more when the eye makes a rotation above the central axis. It is therefore preferable to limit rotations above this axis.

Figure 1D:
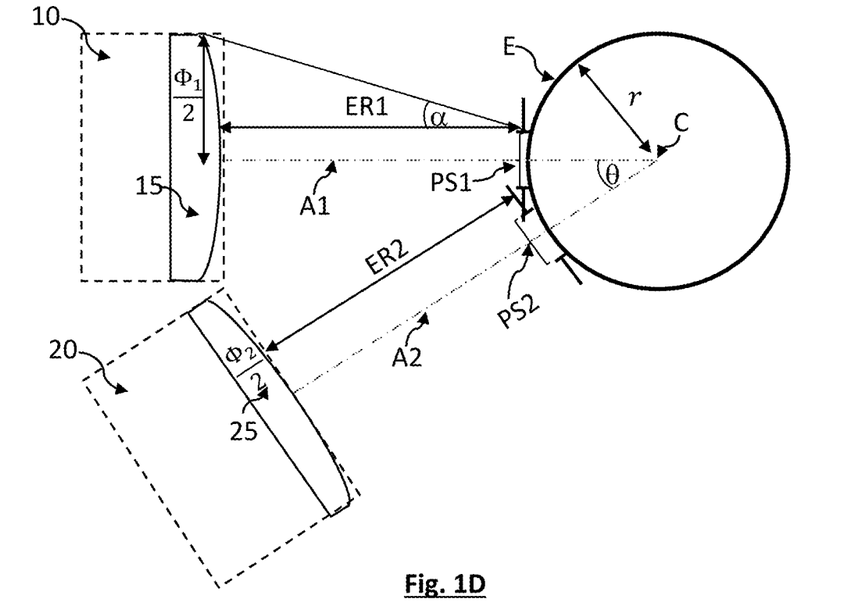
FIG. 1D illustrates parameters allowing the viewfinder to be dimensioned.

FIG. 1D schematically shows:

a first optical system 10, configured to propagate the first image I1 to the eye E, the first image propagating through the exit pupil PS1, along the first axis A1.

a second optical system 20, configured to propagate the second image I2 to the eye E, the second image propagating through the exit pupil PS2, along the second axis A2.

The term optical system designates a set of refractive and/or reflective optical elements allowing the path of light rays to be modified. The first and second optical systems each define one optical channel.

In FIG. 1D, quantities to be considered when dimensioning each optical system have also been shown schematically. Each optical system extends to an exit end, which corresponds to the end of the optical system closest to the eye. The exit end of each optical system is formed by an exit dioptric interface. Thus, the exit end of the first and second optical systems is formed by a first exit dioptric interface 15 and a second exit dioptric interface 25, respectively. It is preferable for the exit dioptric interfaces 15 and 25 to have a convergent effect, this allowing compactness to be increased.

One quantity to be considered is eye relief ER. In each optical system, the eye relief corresponds to the distance between the exit dioptric interface and the eye in the optimal position of use. Conventionally, allowance is made for an eye relief larger than or equal to 15 mm. Thus, the first exit dioptric interface 15 and the second exit dioptric interface 25 are centred on the first axis and on the second axis and are placed, respectively, at distances ER1 and ER2 larger than 15 mm from the spherical surface S to which the exit pupils PS1 and PS2 are tangent. Preferably ER1=ER2=ER.

In FIG. 1D, the angle α defining the field of view along the lateral axis Y of each image has been shown. The diameter Φ1 of the first exit dioptric interface 15 may be defined according to the expression:

$$\frac{\Phi 1}{2} = \frac{\Phi_{PS1}}{2} + ER\tan(\alpha) \quad (1)$$

The diameter Φ2 of the second exit dioptric interface 25 is obtained according to the expression:

$$\frac{\Phi 2}{2} = \frac{\Phi_{PS2}}{2} + ER\tan(\alpha) \quad (1')$$

$\Phi_{PS1}$ and $\Phi_{PS2}$ are the diameter of the exit pupils PS1 and PS2, respectively.

Typical values of Φ1 and of Φ2 may for example be comprised between 5 mm (setting $\Phi_{PS1}=\Phi_{PS2}=4$ mm; ER1=ER2=15 mm, and α=10°) and 25 mm (setting $\Phi_{PS1}=\Phi_{PS2}=12$ mm; ER1=ER2=22 mm, and α=41°).

Preferably, $\Phi_{PS1}=\Phi_{PS2}$, the values of $\Phi_{PS1}$ and $\Phi_{PS1}$ typically being comprised between 2 mm and 18 mm.

The angle of rotation of the eye θ corresponds to the angle described by the eye to pass from a position centred on the first optical axis A1 to a position centred on the second optical axis A2 and vice versa. The angle of rotation θ may be calculated using the expression:

$$\theta = 2A\tan\left(\frac{\frac{\Phi}{2}}{ER+r}\right) \quad (2)$$

where r is the ocular radius and Φ=Φ1=Φ2

The ocular radius r is considered to be equal to 12.5 mm, this corresponding to an ocular diameter of 25 mm.

The angle of rotation θ is preferably smaller than 40°, the value of 40° being a biological limit of the human eye. If the upper limit of 25 mm is used for ¢ (obtained by setting ER=22 mm and $\Phi_{PS1}=\Phi_{PS2}=12$ mm, and α=41°) then θ=72°. Such a rotation-angle value is too great. In order to limit the angle of rotation to 40°, the device must be dimensioned taking into account the following conditions:

α comprised between 10° and 22°;
ER comprised between 15 mm and 25 mm;
$\Phi_{PS1}$ and $\Phi_{PS2}$ comprised between 4 and 18 mm.

Figure 2A:
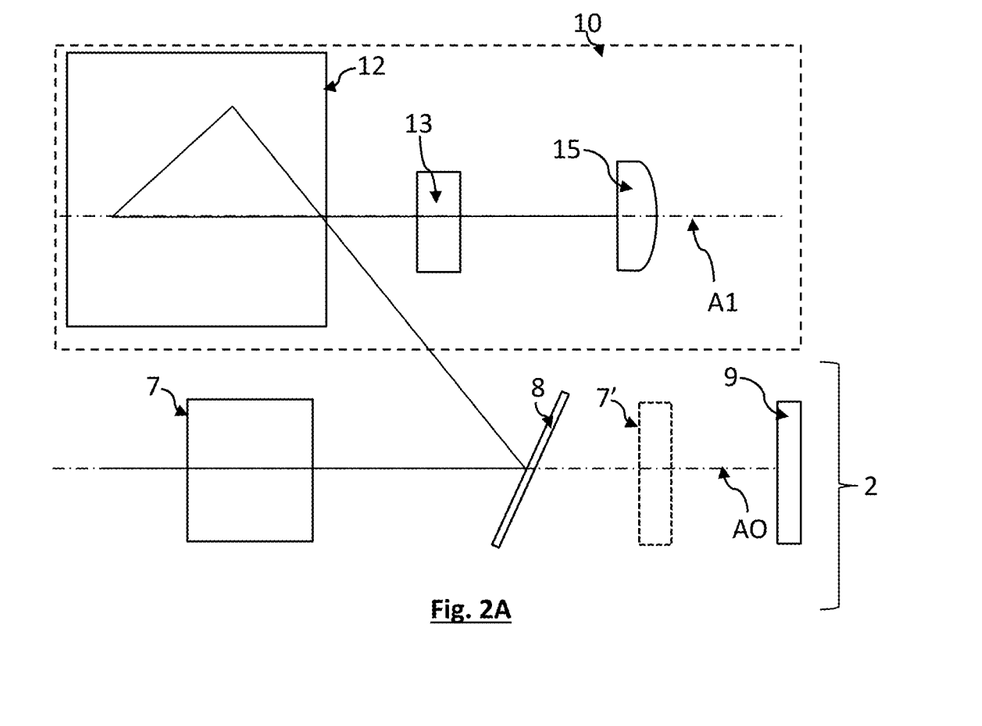
FIG. 2A show a first example of a first optical system.

FIG. 2A schematically shows one embodiment in which the first optical system is configured to project an image formed from light rays emitted by a scene observed by the observation objective 7 of the observing device 2. In this embodiment, the observing device comprises an observation objective 7 coupled to an image sensor 9, a CMOS sensor for example. The observation objective 7 and the image sensor 9 are centred with respect to an optical axis of observation AO, which forms the optical axis of the observing device 2. The image sensor 9 defines a detection plane, in which an observation image of the observed scene is formed. The optical axis of observation AO is perpendicular to the detection plane.

Generally, the first optical system 10 is configured to project a first image I1, formed by an image-forming means, towards the eye. The light rays forming the first image reach the eye by propagating about the first axis A1. The first image I1 is representative of the observed scene. It may be formed from light rays incident on the image sensor 9. Thus, the first image I1 is independent of settings of the image sensor.

In the embodiment shown in FIG. 2A, the viewfinder 1 comprises a splitter 8, for example a half-silvered mirror or a dichroic plate, configured to reflect some of the rays that have propagated through the observation objective 7. The splitter 8 is placed between the observation objective 7 and the image sensor 9. The splitter acts as an image-forming means with respect to the first optical system 10. The image reflected by the splitter 8 is a first image I1, representative of the observed scene. The first optical system 10 is arranged to project the first image I1 onto the eye, along the first optical axis A1. Preferably, the first optical axis A1 is parallel to the optical axis of observation AO.

The first optical system 10 comprises a prism 12, typically a pentaprism, configured to orient the propagation of the light rays, forming the first image, parallel to the optical axis of observation AO, so that said rays reach the eye by propagating along the axis A1 parallel to the optical axis of observation AO. The optical system 10 may comprise one or more shaping dioptric interfaces 13 and the exit dioptric interface 15 described above.

In this embodiment, the viewfinder 1 acts as a passive viewfinder, or direct viewfinder: the rays propagating through the first optical system originate from the observed scene (the viewfinder has a "reflex" configuration). In this embodiment, the means for forming the first image I1 is the splitter 8 placed transversely to the optical axis of observation AO.

The first embodiment is suitable for applications in which the first image, resulting from the splitter 8, is an image acquired in a spectral band different from the image acquired by the image sensor 9. For example, the first image is formed in a fluorescence spectral band whereas the image acquired by the image sensor is an image, in all the visible spectrum, of the observed scene. In this case, the splitter 8 may be a dichroic plate.

The first embodiment is suitable for applications in which the first image and the image acquired by the image sensor are formed in the same spectral band, but with different magnifications. In this case, the splitter is a half-silvered mirror. A auxiliary optical system 7' may be placed between the splitter 8 and the image sensor 9. The image sensor 9 acquires an image the magnification of which is higher than the magnification of the first image. Alternatively, the first optical system 10 applies an additional magnification to the image reflected by the splitter. Such an embodiment is suitable for microscopy applications as it allows two images of the same scene to be observed with different magnifications.

Figure 2B:
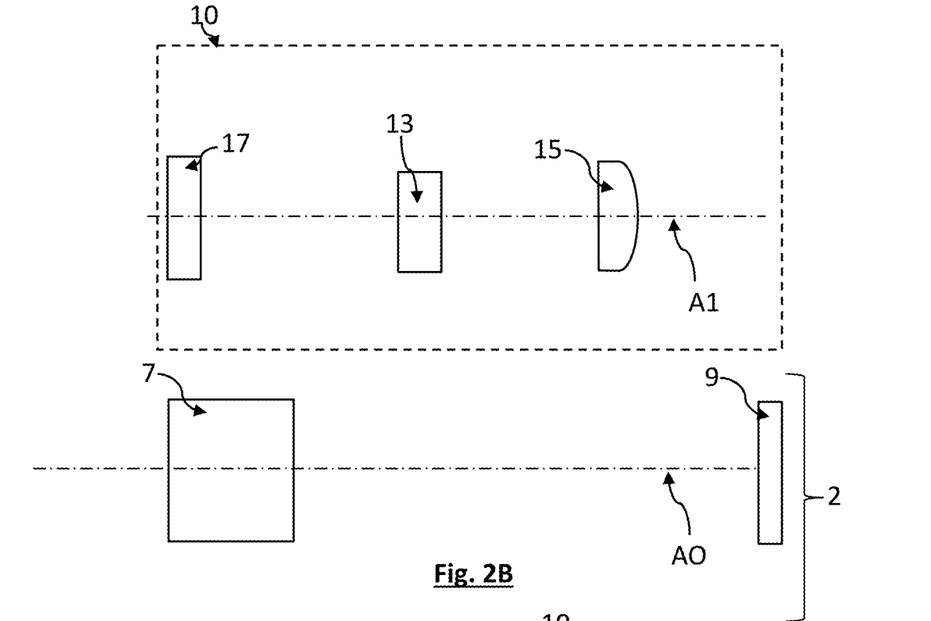
FIG. 2B show a second example of a first optical system.

In a second embodiment, shown in FIG. 2B, the viewfinder also acts as a passive viewfinder. The rays transported by the first optical system 10 originate from the observed scene. The first optical system may comprise an auxiliary objective 17 different from the main objective 7 and the optical axis of which is parallel to the optical axis of observation AO. The first optical system 10 may comprise one or more shaping lenses 13. In this embodiment, the means for forming the first image I1 is the auxiliary objective 17. The distance between the first optical axis A1 and the optical axis of observation AO is minimized in order to decrease parallax.

Figure 2C:
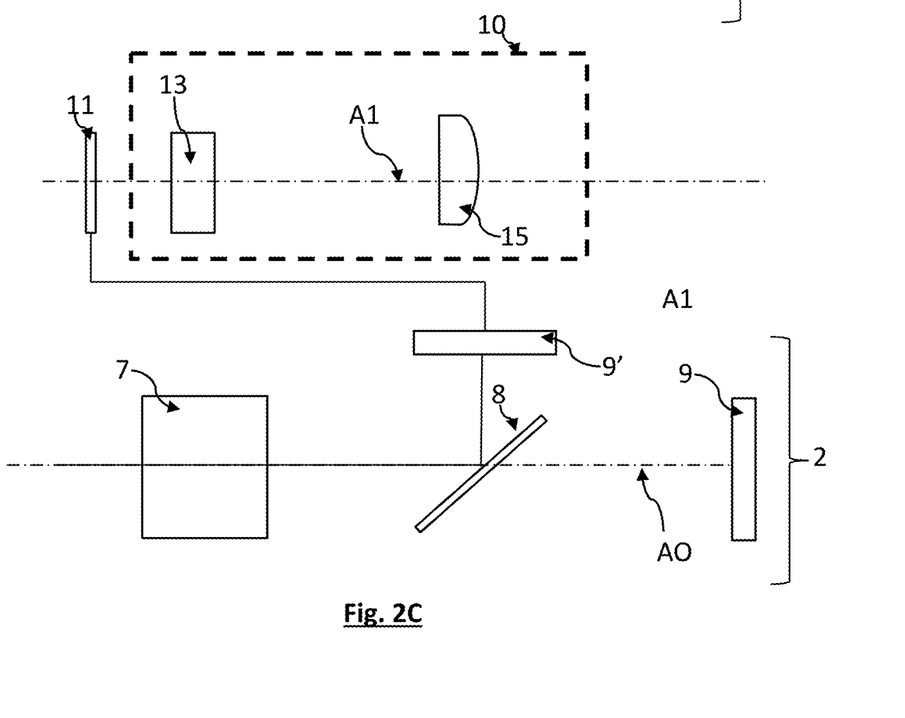
FIG. 2C show a third example of a first optical system.

In a third embodiment, shown in FIG. 2C, the splitter 8 is associated with an auxiliary image sensor 9'. The auxiliary image sensor 9' is associated with an auxiliary display 11, the latter displaying the first image I1. The optical system 10 is configured to project the first image I1 onto the eye, along the first axis A1, the latter preferably being parallel to the optical axis AO. The optical system 10 comprises one or more shaping dioptric interfaces 13 and the exit dioptric interface 15.

Figure 3:
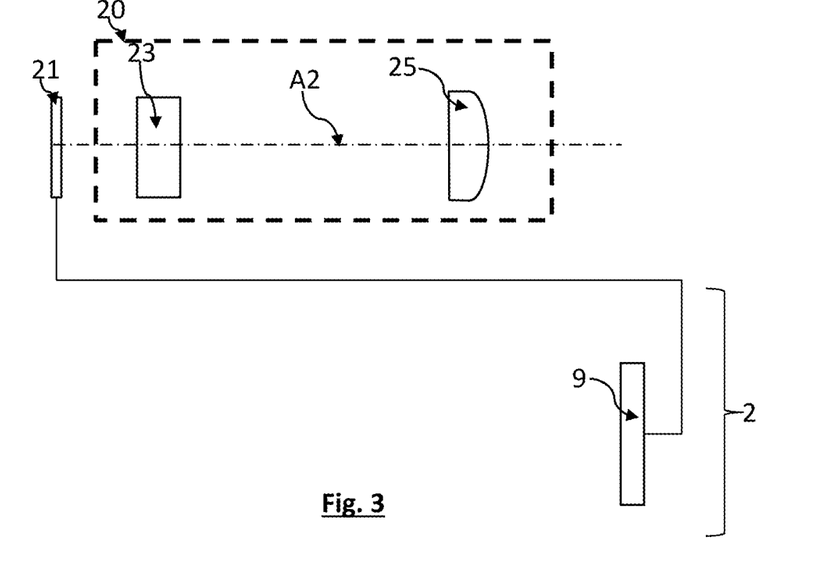
FIG. 3 show one example of a second optical system.

FIG. 3 shows the second optical channel, which is intended to form and to project a second image I2 using the second optical system 20. The second optical channel comprises a display referred to as the secondary display 21, and which is connected to the image sensor 9. The secondary display displays a second image I2, which corresponds either to the image acquired by the image sensor 9, optionally after application of an image-processing operation, or to information regarding the observing system or its environment, this information potentially including parameters or results of the image processing performed by the image sensor 9, or to a combination of both thereof. The information is for example stored in a unit for controlling the observing device, which control unit is connected to the image sensor 9. The second optical system 20 transports the second image I2, displayed by the secondary display 21, so that the second image is projected onto the eye parallel to the second axis A2. The second optical system 20 comprises one or more dioptric interfaces 23, allowing the image to be formed, and the second exit dioptric interface 25 described above.

When the first image I1 is formed such as described with reference to one of FIGS. 2A to 2C, and when the second image I2 is formed as described with reference to FIG. 3, the user of the camera 2 may observe, in the viewfinder 1, two juxtaposed images: the first image I1 is representative of the observed scene, independently of the settings of the image sensor 9. The second image I2 is representative of the image acquired by the image sensor 9, and of any digital processing applied to the image. The user may thus compare the two images, which have the same size, this allowing him to view the effect of adjustment of the settings of the image sensor 9 or of digital processing applied to the image acquired by the image sensor.

According to one variant, shown in FIG. 4A, and which is compatible with the configurations described with reference to FIGS. 2A to 2C, the first optical system is coupled to a third optical channel, allowing a third image I3 to be superposed on the image of the first optical channel. The third image contains information regarding the observing system or its environment, this information potentially including parameters or results of the image processing performed by the image sensor 9. The parameters may include, for example, exposure time, aperture, white balance, etc. It may also be a question of visual elements relating to the image acquired by the image sensor 9, of indicators of overexposed or underexposed regions for example. It may also be a question of contextual information, of the date, time or place for example. The information is for example stored in a unit for controlling the observing device, which control unit is connected to the image sensor 9.

The third image is superposed on the first image I1, according to the principles of augmented reality. The viewfinder comprises a parameter-displaying display 31, configured to display the third image I3. The third image I3 is propagated by a third optical system 30 to a combiner 35, which is arranged to propagate the third image, to the eye, parallel to the first axis A1. The third image I3 is thus projected into the eye superposed on the first image I1. See FIG. 4B.

Figure 4A:
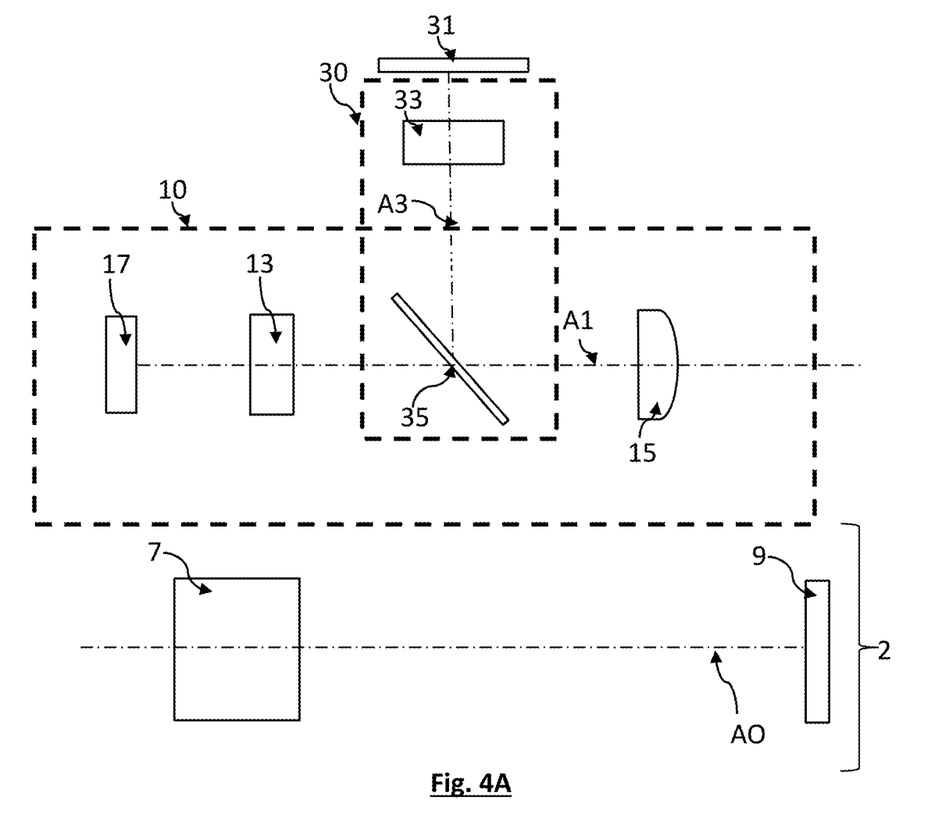
FIG. 4A illustrates one embodiment in which the first image is an image that is augmented with information contained in a third image that is delivered by a third optical system.
Figure 4B:
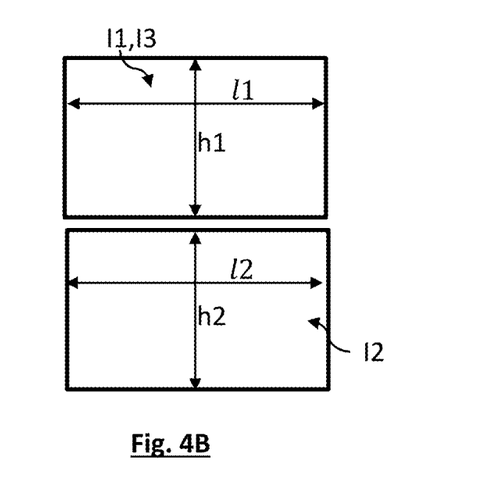
FIG. 4B shows a configuration of images formed by the viewfinder described with reference to FIG. 4A.
Figure 5:
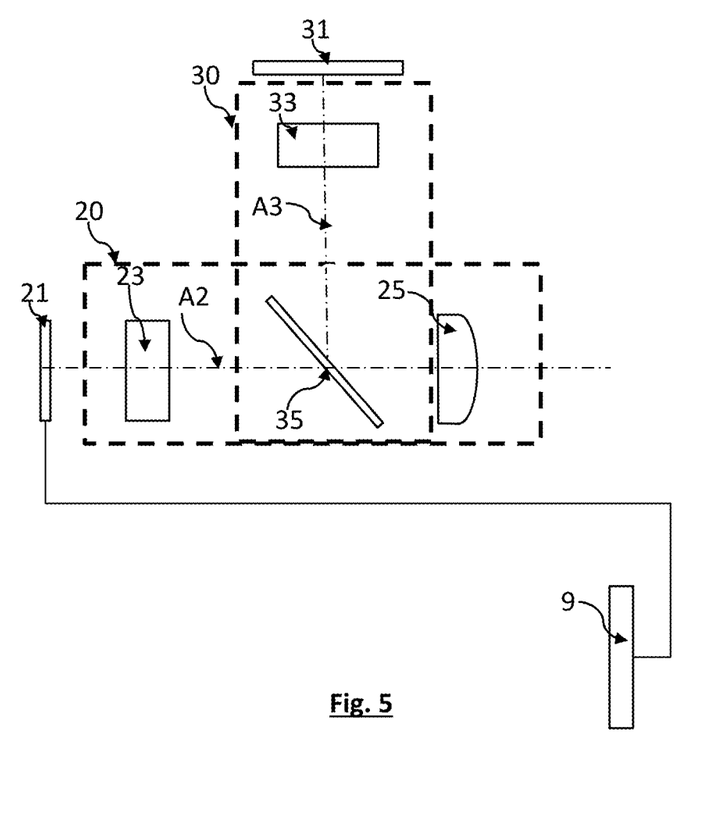
FIG. 5 illustrates one embodiment in which the second image is an image that is augmented with information contained in a third image that is delivered by a third optical system.

The third optical channel, which has been shown schematically in FIG. 4A, may be combined with the configuration shown in FIGS. 2A to 2C, or with the second optical channel, as shown in FIG. 5. In the latter case, the viewfinder allows the third image I3 to be projected superposed on the second image I2, according to the principles of augmented reality.

One aspect to be taken into account is the focus of the projected images. In order for the user not to have to accommodate his vision, the first image I1 and the second image I2, and optionally the third image I3, must be displayed in the depth of field of the eye. By depth of field, what is meant is the variation in distance able to be tolerated without leading to a significant lack of sharpness. This is expressed by the following constraint on the optical systems: the distances $d_1$, $d_2$ and $d_3$, defined between the pupils PS1, PS2 and PS3 (which is equal to PS1 by construction in the configuration of FIG. 4A) and the images I1, I2 and I3 seen through their respective optical channels, expressed in dioptres (1/m), respectively, must not differ by more than 0.25 dioptres from one another. Namely:

$$\left| \frac{1}{d_1} - \frac{1}{d_2} \right| \leq 0.25$$

$$\left| \frac{1}{d_2} - \frac{1}{d_3} \right| \leq 0.25$$

$$\left| \frac{1}{d_1} - \frac{1}{d_3} \right| \leq 0.25$$

Figure 6:
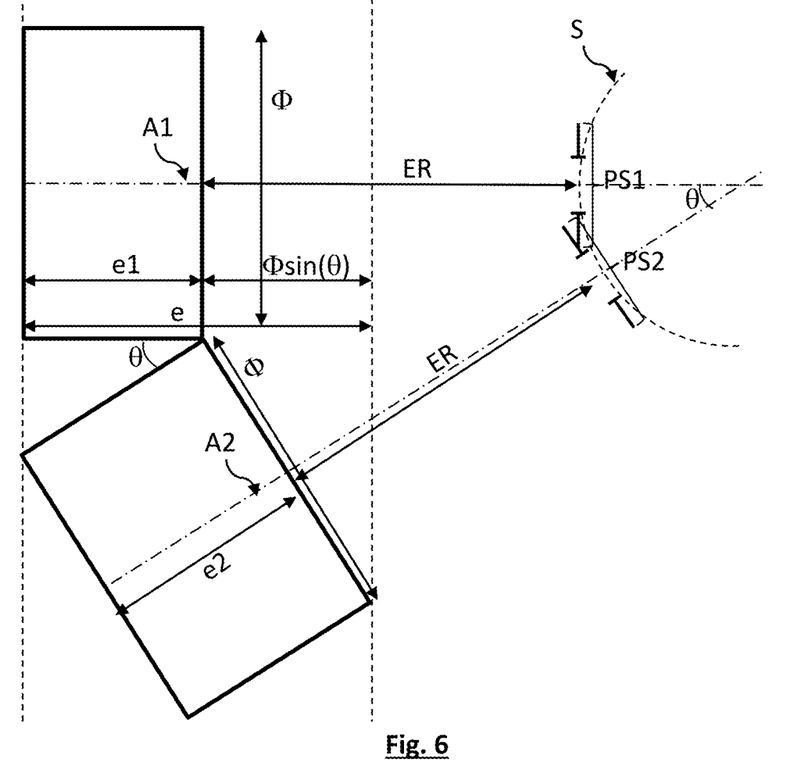
FIG. 6 shows the respective bulks of each optical system comprising the optical axes of each optical system.

The viewfinder is intended to be integrated into an observing device 2, a camera or a telescope for example. The bulk of the viewfinder must be such as to allow such an integration. It is assumed that the eye-relief parameters ER and the diameter of each exit pupil are identical for each optical channel. The volume of the viewfinder is limited by the exit dioptric interfaces 15 and 25, the diameter $\Phi$ of which is defined in (1). FIG. 6 shows an arrangement, in which the first and second optical systems lie, in a plane passing through each optical axis, in two respective parallelepipeds that make contact with each other, and that are of respective thicknesses e1 and e2. The thicknesses e1 and e2 are related by the expression:

$$e1 = e2 \cos(\theta) \quad (4)$$

The total thickness e is such that $e = e1 + \phi \sin(\theta)$.

The viewfinder may be dimensioned taking into account the following parameters, the first optical system being such as described with reference to FIG. 2B.

For each optical system:
ER=18 mm;
$\Phi_{PS1} = \Phi_{PS2} = 12$ mm;
Angular field: 21°×17° (landscape format);
Distance of projection of the virtual image: 4000;
Magnification of the first optical system: 1;
Dimension of the secondary display 21 and of the parameter-displaying display 31: 12.1 mm×9.7 mm.

Given these values, the inventors deem that the thickness e1 may be comprised between 4 mm and 55 mm, the thickness e2 may be comprised between 4 and 70 mm, and that the total thickness e may be comprised between 7 and 85 mm, a viewfinder with these dimensions being integrable into a device such as a camera.

Figure 7A:
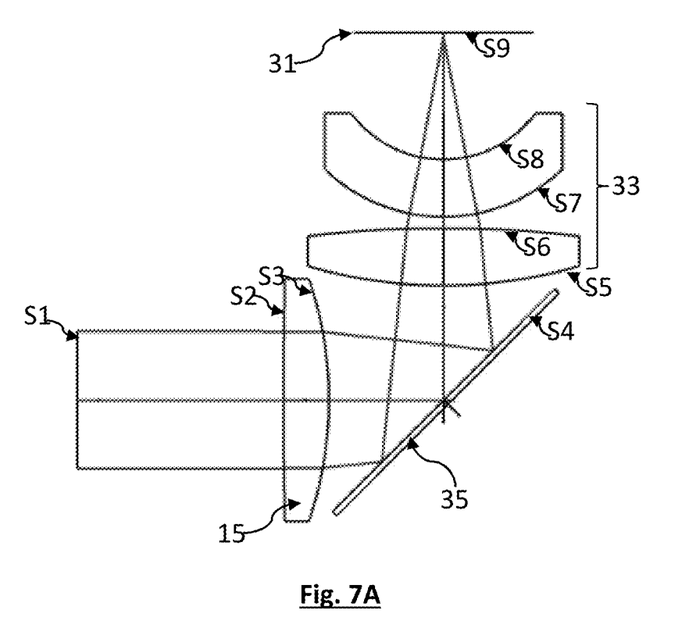
FIGS. 7A, 7B and 7C are schematics of the first optical system, of the second optical system and of the third optical system, respectively.
Figure 7B:
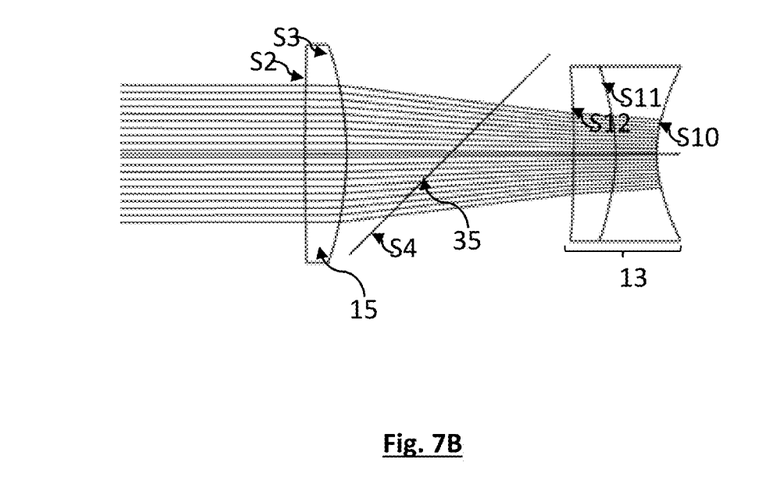
Figure 7C:
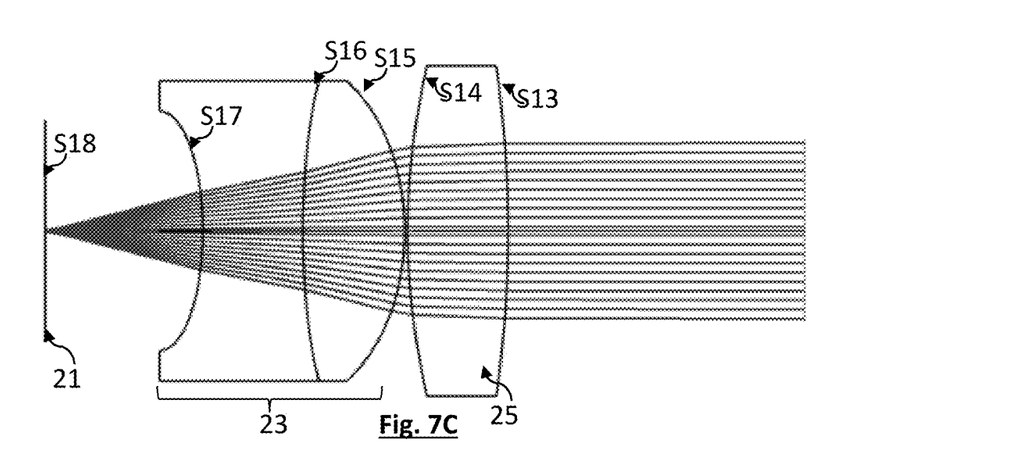

FIGS. 7A, 7B and 7C are design of the third optical system, first optical system and second optical system, respectively. In these design drawings, the thicknesses e1, e2 and e are equal to 34 mm, 28 mm and 34 mm, respectively.

The tables below collate the main characteristics of the dioptric interfaces, according to the nomenclature described in Herbert Gross, Handbook of Optical Systems, Volume 4 "Survey of optical instruments", Chapter 37.15 Eyepiece Design Data. For each surface, the material and the thickness correspond to the space between said surface and the surface of following rank.

TABLE 1

| Surface (rank) | Material | Radius (mm) | Thickness (mm) | "Conic" eccentricity |
|---|---|---|---|---|
| S1 | air | infinite | 18 | |
| S2 | N-BK7 | 148.64 | 4 | −57.26 |
| S3 | air | −37.02 | 10 | −1.13 |
| S4 | mirror | infinite | 0 | |
| S5 | S-BSM25 | −34.86 | −5 | |
| S6 | air | 362.5 | −1 | |
| S7 | SF2 | −14.18 | −5 | |
| S8 | air | −9.69 | 0 | |

In Table 1, S1 corresponds to the first exit pupil. The mirror is inclined to 45°.

TABLE 2

| Surface (rank) | Material | Radius (mm) | Thickness (mm) | "Conic" eccentricity |
|---|---|---|---|---|
| S10 (doublet) | N-BK7 | 13.02 | −4 | −3.17 |
| S11 | SF2 | −19.47 | −4 | −5.85 |
| S12 | air | −129.11 | −12 | 176.15 |

TABLE 3

| Surface (rank) | Material | Radius (mm) | Thickness (mm) | "Conic" eccentricity |
|---|---|---|---|---|
| S13 | S-LAH58 | 68.55 | 6.09 | −5.03 |
| S14 | air | −40.25 | 0.18 | −4.56 |
| S15 | N-BAK1 | 15.31 | 6.17 | 1.07 |
| S16 | S-TIH53 | −50.90 | 6.07 | 17.08 |
| S17 | air | 19.92 | 9.57 | 6.57 |
| S18 | air | infinite | 0.0 | 0.0 |

In Table 3, S18 corresponds to the display forming the second image.

Figure 8:
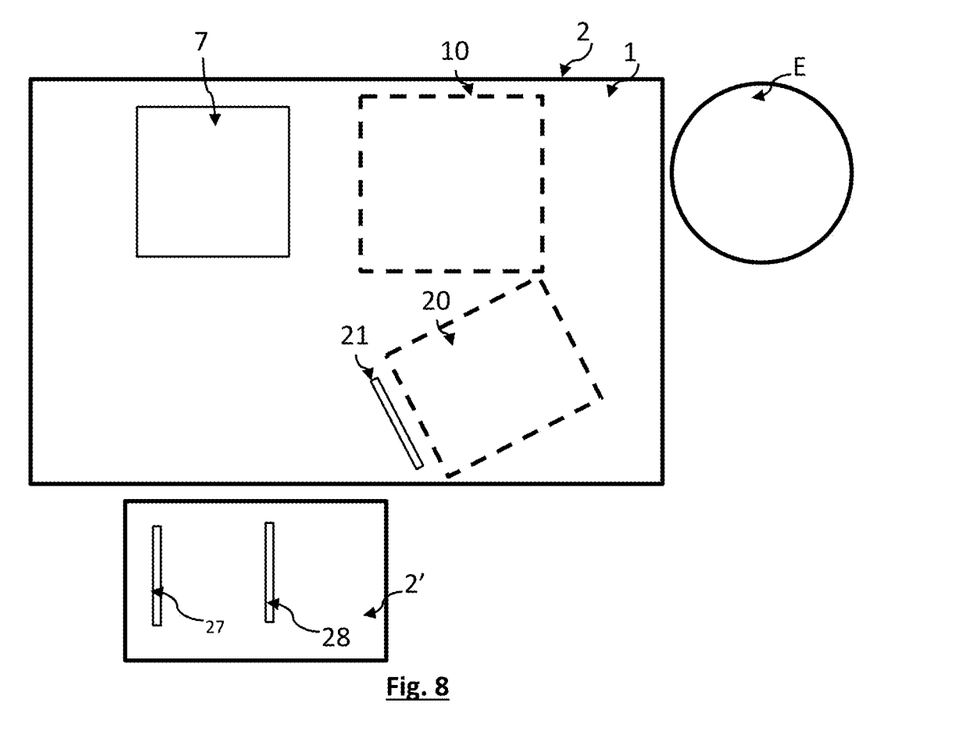
FIG. 8 schematically shows one embodiment in which the observing device is a telescope, forming a first image, and in which the second image is acquired by a peripheral device, able to be placed remote from the observing device.

The observing device 2 may be other than a camera. It may for example be a spotting scope as shown in FIG. 8. The scope comprises an observation objective 7, allowing a scene to be observed. The observation objective plays the role of means for forming a first image I1. The scope comprises a first optical system, configured to project the image of the scene, forming a first image, towards the eye. In this embodiment, the device comprises a peripheral device 2', separate from the observing device and able to be remote from the latter. The peripheral device comprises a remote image sensor 27, connected to a transmitting unit 28. The transmitting unit is configured to transmit the image acquired by the remote image sensor 27 to a display 21. The display 21 displays the image acquired by the remote image sensor 27, said image propagating to the eye of the user through a second optical system 20, as described with reference to FIG. 3.

According to one possibility, the peripheral device 2' is able to move with respect to the observing device 2. It is for example located on board a vehicle, a drone for example. The observing device allows the drone to be monitored remotely, while viewing the image acquired by the peripheral image sensor located on board the drone. Thus, the first image I1 corresponds to an image showing the drone, the latter forming the scene observed by the observing device 2. The second image I2 corresponds to the image seen by the image sensor located on board the drone. Using the viewfinder 1, the user may, while looking through the viewfinder, view the two images via a simple rotation of the eye. He may thus control the drone, depending on the second image, and monitor the position of the drone in the first image.

The first image or the second image may contain information regarding the viewfinder or the device, adjustable parameters for example.

The viewfinder described above allows two images to be observed simultaneously. It may be a question of two images representative of the same observed scene, for example:
  an image of a scene, formed from light emitted by the scene, and an image of the scene such as perceived by an image sensor;
  two images of the same scene with two different magnifications;
  two images of the same scene, in different spectral bands;
  two images of two different scenes.

The viewfinder may be integrated into observing devices such as still cameras, video cameras, microscopes, telescopes, spotting scopes, microscopes, weapons, periscopes, and medical imaging devices.

The invention claimed is:

1. A viewfinder, configured to be placed facing an eye of a user of an observing device, the observing device comprising an observation objective intended to form an image of an observed scene, the viewfinder comprising:
  a device for forming a first image, representative of the observed scene;
  a first optical system, coupled to the device for forming the first image, and arranged to propagate the first image to a first exit pupil, about a first optical axis, the light rays forming the first image reaching the first exit pupil by propagating about the first optical axis;
wherein the viewfinder comprises:
  a secondary display, emitting a second image, different from the first image;
  a second optical system, lying between the secondary display and a second exit pupil, about a second optical axis, inclined with respect to the first optical axis, the second optical system being configured to propagate the second image to the second exit pupil, the light rays forming the second image reaching the second exit pupil by propagating about the second optical axis;
and wherein:
  the first exit pupil and the second exit pupil are tangent to the same spherical surface, the diameter of which is comprised between 1.5 cm and 3 cm, wherein the spherical-surface diameter corresponds to the ocular diameter;
  the first optical axis and the second optical axis converge, to a point of convergence, corresponding to the centre of said spherical surface, wherein the point of convergence is located in the eye of the user such that the user may view
  the first image when the eye is oriented along the first optical axis;

the second image when the eye is oriented along the second optical axis.

2. The viewfinder according to claim 1, wherein the first optical axis and the second optical axis are coplanar and lie in a vertical or horizontal plane.

3. The viewfinder according to claim 1, wherein:
the first image and the second image, viewed respectively at the first and at the second exit pupil, extend:
about a longitudinal axis, defining a width;
parallel to a lateral axis, defining a height;
the second axis and the first axis lie in a plane parallel to the lateral axis, wherein the first image and the second image are juxtaposed while being aligned with respect to each other parallel to the lateral axis;
or the second axis and the first axis lie in a plane parallel to the longitudinal axis, wherein the first image and the second image are juxtaposed while being aligned with respect to each other parallel to the longitudinal axis.

4. The viewfinder according to claim 1, wherein the first optical axis and the second optical axis are inclined with respect to each other by an angle of inclination smaller than 40°.

5. The viewfinder according to claim 1, wherein:
the observation objective forms the image of the observed scene about an optical axis of observation;
the first optical axis is parallel to the optical axis of observation.

6. The viewfinder according to claim 1, wherein:
the observing device is an image-capturing apparatus, comprising an image sensor, the image sensor being configured to acquire the image of the observed scene, formed by the observation objective;
the secondary display is connected to the image sensor, so that wherein the second image is formed from the image acquired by the image sensor.

7. The viewfinder according to claim 6, wherein:
the device for forming the first image is a splitter, arranged to be placed between the observation objective and the image sensor, the splitter being oriented so as to steer the image of the observed scene, focused by the objective, towards the first optical system;
the first optical system extends from the splitter.

8. The viewfinder according to claim 6, wherein:
the device for forming the first image is an auxiliary objective, different from the observation objective, intended to form an image of the observed scene;
the first optical system extends from the auxiliary objective.

9. The viewfinder according to claim 6, wherein:
the device for forming the first image is an auxiliary display, intended to display an image of the observed scene;
the first optical system extends from the auxiliary display.

10. The viewfinder according to claim 6, wherein the image-capturing apparatus comprises a unit for controlling the image sensor, and wherein the viewfinder comprises:
a display, connected to the control unit and configured to display a third image;
a third optical system, configured to propagate the third image to the first optical system.

11. The viewfinder according to claim 1, wherein the first optical system extends to a first exit dioptric interface, the first exit dioptric interface being positioned at a distance larger than or equal to 15 mm from the first exit pupil.

12. The viewfinder according to claim 1, wherein the second optical system extends to a second exit dioptric interface, the second exit dioptric interface being positioned at a distance larger than or equal to 15 mm from the second exit pupil.

13. The viewfinder according to claim 1, wherein
the observing device is magnifying, the first optical system and the observing objective being one and the same;
the image sensor is placed on a peripheral device, separate from the observing device;
the secondary display is configured to display an image acquired by the image sensor, optionally after application of an image-processing operation.

14. An observing device, comprising an observation objective, intended to form an image of an observed scene, about an optical axis of observation, the observing device comprising the viewfinder according to claim 1.

15. The observing device according to claim 14, the observing device being a camera comprising an image sensor, the image sensor being configured to acquire the image of the observed scene, formed by the observation objective.

16. The observing device according to claim 14, the observing device being magnifying, the first optical system and the observation objective being one and the same.

* * * * *